United States Patent
Ke

(10) Patent No.: US 12,477,402 B2
(45) Date of Patent: Nov. 18, 2025

(54) INFORMATION TRANSMISSION METHOD AND COMMUNICATIONS DEVICE FOR BRIDGE MANAGEMENT

(71) Applicant: VIVO MOBILE COMMUNICATION CO., LTD., Dongguan (CN)

(72) Inventor: Xiaowan Ke, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 433 days.

(21) Appl. No.: 17/751,645

(22) Filed: May 23, 2022

(65) Prior Publication Data
US 2022/0286913 A1 Sep. 8, 2022

Related U.S. Application Data

(63) Continuation of application No. PCT/CN2020/133292, filed on Dec. 2, 2020.

(30) Foreign Application Priority Data

Dec. 3, 2019 (CN) .......................... 201911222880.6

(51) Int. Cl.
*H04W 28/10* (2009.01)
*H04W 28/02* (2009.01)

(52) U.S. Cl.
CPC ....... *H04W 28/10* (2013.01); *H04W 28/0236* (2013.01)

(58) Field of Classification Search
CPC ......... H04W 28/0231; H04W 28/0236; H04W 28/0242; H04W 28/10; H04W 28/0268;
(Continued)

(56) References Cited

U.S. PATENT DOCUMENTS

| 2013/0250971 A1 | 9/2013 | Mora et al. |
| 2018/0338265 A1 | 11/2018 | Goel et al. |
| 2022/0312512 A1* | 9/2022 | Li ....................... H04L 65/1016 |

FOREIGN PATENT DOCUMENTS

| CN | 109787919 A | 5/2019 |
| CN | 110213007 A | 9/2019 |

(Continued)

OTHER PUBLICATIONS

Extended European Search Report issued in related European Application No. 20896814.9, mailed Nov. 11, 2022, 20 pages.
(Continued)

*Primary Examiner* — Peter Chen
(74) *Attorney, Agent, or Firm* — IPX PLLC

(57) ABSTRACT

An information transmission method and a communications device are provided. The method includes: performing a related operation of a first port; and sending first information; where the related operation of the first port includes at least one of the following: obtaining the port related information of the first port, determining the related information of the Time-sensitive network Translator (TT) of the first port, and determining the delay related information of the first port; the first information includes at least one of the following: the port related information of the first port, the related information of the TT of the first port, and the delay related information of the first port; and the first port is a port of a time-sensitive network translator TT.

12 Claims, 6 Drawing Sheets

(58) Field of Classification Search
CPC ... H04W 28/24; H04W 92/02; H04W 56/001; H04W 56/0015; H04W 56/002; H04W 76/10; H04W 76/12; H04L 47/24; H04L 47/28; H04L 47/283; H04L 47/286; H04L 47/2416; H04L 47/2491; H04L 12/462; H04L 12/4625
See application file for complete search history.

(56) References Cited

FOREIGN PATENT DOCUMENTS

| | | |
|---|---|---|
| CN | 110267312 A | 9/2019 |
| EP | 3451598 A1 | 3/2019 |
| EP | 4033701 A1 | 7/2022 |
| WO | 2017082779 A1 | 5/2017 |
| WO | 2019155561 A1 | 8/2019 |

OTHER PUBLICATIONS

Qualcomm Incorporated et al. "5GS Bridge Management", 3GPP TSG-SA WG2 Meeting#136, S2-1912360, Nov. 2019, 10 pages.

NTT Docomo et al, "TSN parameters", 3GPP TSG-SA2 Meeting#135, S2-1909810, Oct. 2019, 28 pages.

NTT Docomo et al, "TSN parameters", 3GPP TSG-SA2 Meeting#136, S2-1910924, Nov. 2019, 28 pages.

VIVO, "TSN bridge Managed Objects (MO) collection", 3GPP TSG-SA2 Meeting#131, S2-1901636, Feb. 2019, 4 pages.

Ericsson, "Amendment of contradiction related to PMIC", SA WG2 Meeting#S2-140E, S2-2004913, Aug. 2020, 10 pages.

International Search Report issued in corresponding International Application No. PCT/CN2020/133292, mailed Mar. 3, 2021, 4 pages.

Qualcomm Incorporated, "Completing Ethernet port management", SA WG2 Meeting #134, S2-1906940, Jun. 28, 2019.

Qualcomm Incorporated et al, "Completing Ethernet port management", 3GPP TSG-SA WG2 Meeting #133, S2-1908563, Jun. 28, 2019.

First Office Action issued in related Chinese Application No. 201911222880.6, mailed Sep. 17, 2021, 12 pages.

Second Office Action issued in related Chinese Application No. 201911222880.6, mailed Apr. 11, 2022, 6 pages.

* cited by examiner

INFORMATION TRANSMISSION METHOD AND COMMUNICATIONS DEVICE FOR BRIDGE MANAGEMENT

CROSS-REFERENCE TO RELATED APPLICATIONS

This application is a continuation of International Application No. PCT/CN2020/133292, filed on Dec. 2, 2020, which claims priority to Chinese Patent Application No. 201911222880.6, filed on Dec. 3, 2019. The entire contents of each of the above-identified applications are expressly incorporated herein by reference.

TECHNICAL FIELD

The present disclosure relates to the field of communication technologies, and in particular, to an information transmission method and a communications device.

BACKGROUND

Many vertical industries all have requirements for time-sensitive communication. In the industrial Internet, there is time-sensitive data, such as a robot instruction, that needs to be sequentially executed within a specified time. However, a network transmission resource is shared, and data transmission has delay and jitter and cannot support time-sensitive data. Therefore, a time-sensitive network is proposed to support transmission of time-sensitive data.

In a time-sensitive network, data can be forwarded between a transmit end and a receive end of a time-sensitive data stream through one or more bridges. Therefore, a wireless connection may be a transmission medium in a time-sensitive network. Therefore, how to support the control and management of bridge-related information is a technical problem that needs to be solved urgently at present.

SUMMARY

Embodiments of the present disclosure provide an information transmission method and a communications device.

According to a first aspect, an embodiment of the present disclosure provides an information transmission method, applied to a first communications device and including:
  performing a related operation of a first port; and
  sending first information, where
  the related operation of the first port includes at least one of the following: obtaining port related information of the first port, determining related information of a Time-Sensitive Network Translator (TSN Translator, or TT) of the first port, and determining delay related information of the first port;
  the first information includes at least one of the following: the port related information of the first port, the related information of the TT of the first port, and the delay related information of the first port; and
  the first port is a port of a TT.

According to a second aspect, an embodiment of the present disclosure provides an information transmission method, applied to a second communications device and including:
  obtaining second information; and
  performing a port related operation according to the second information; where the second information includes at least one of the following: port related information of a first port, related information of a TT of the first port, delay related information of the first port, a first container, a second container, and a data channel MAC address; and
  the first port is a port of a TT.

According to a third aspect, an embodiment of the present disclosure provides an information transmission method, applied to a third communications device and including:
  obtaining data routing information, where the data routing information includes at least one of the following: data stream identification information and port related information; and
  performing a related operation on a downlink data stream according to the data routing information.

According to a fourth aspect, an embodiment of the present disclosure provides an information transmission method, applied to a fourth communications device and including:
  obtaining port related information of a second port; and
  sending the port related information of the second port; where
  the second port is a port of a NetWork-side Time-sensitive network Translator (NW-TT).

According to a fifth aspect, an embodiment of the present disclosure provides a communications device, where the communications device is a first communications device, including:
  an execution module, configured to execute a related operation of a first port; and
  a sending module, configured to send first information; where
  the related operation of the first port includes at least one of the following: obtaining port related information of the first port, determining related information of a TT of the first port, and determining delay related information of the first port;
  the first information includes at least one of the following: the port related information of the first port, the related information of the TT of the first port, and the delay related information of the first port; and
  the first port is a port of a TT.

According to a sixth aspect, an embodiment of the present disclosure provides a communications device, where the communications device is a second communications device, including:
  an obtaining module, configured to obtain second information; and
  an execution module, configured to perform a port related operation according to the second information; where
  the second information includes at least one of the following: port related information of a first port, related information of a TT of the first port, delay related information of the first port, a first container, a second container, and a data channel MAC address; and
  the first port is a port of a TT.

According to a seventh aspect, an embodiment of the present disclosure provides a communications device, where the communications device is a third communications device, including:
  an obtaining module, configured to obtain data routing information, where the data routing information includes at least one of the following: data stream identification information and port related information; and an execution module, configured to perform a related operation on a downlink data stream according to the data routing information.

According to an eighth aspect, an embodiment of the present disclosure provides a communications device, where the communications device is a fourth communications device, including:

an obtaining module, configured to obtain port related information of a second port; and a sending module, configured to send the port related information of the second port; where the second port is a port of a NW-TT.

According to a ninth aspect, an embodiment of the present disclosure provides a communications device, including a processor, a memory, and a computer program stored in the memory and executable on the processor, and when the computer program is executed by the processor, steps of the information transmission method according to the first aspect are implemented, or steps of the information transmission method according to the second aspect are implemented, or steps of the information transmission method according to the third aspect are implemented, or steps of the information transmission method according to the fourth aspect are implemented.

According to a tenth aspect, an embodiment of the present disclosure provides a computer-readable storage medium, storing a computer program, where when the computer program is executed by a processor, steps of the information transmission method according to the first aspect are implemented, or steps of the information transmission method according to the second aspect are implemented, or steps of the information transmission method according to the third aspect are implemented, or steps of the information transmission method according to the fourth aspect are implemented.

In the embodiments of the present disclosure, the related operation of the first port is performed; and the first information is sent; where the related operation of the first port includes at least one of the following: obtaining the port related information of the first port, determining the related information of the TT of the first port, and determining the delay related information of the first port; the first information includes at least one of the following: the port related information of the first port, the related information of the TT of the first port, and the delay related information of the first port; and the first port is a port of a TT. Therefore, this can support management and control of bridge related information.

BRIEF DESCRIPTION OF DRAWINGS

With reference to detailed descriptions in exemplary implementations in the following descriptions, various other advantages and benefits become clear to a person of ordinary skills in the art. The accompanying drawings are merely used to show exemplary implementations, and are not considered as limitations to the present disclosure. In addition, in all the accompanying drawings, a same reference symbol is used to represent a same part. In the accompanying drawings.

DETAILED DESCRIPTION

The following clearly and completely describes the technical solutions in the embodiments of the present disclosure with reference to the accompanying drawings in the embodiments of the present disclosure. Apparently, the described embodiments are some rather than all of the embodiments of the present disclosure. All other embodiments obtained by a person of ordinary skill in the art based on the embodiments of the present disclosure without creative efforts shall fall within the protection scope of the present disclosure.

The term "include" and any other variants in the specification and claims of the present disclosure mean to cover the non-exclusive inclusion, for example, a process, method, system, product, or device that includes a list of steps or units is not necessarily limited to those steps or units, but may include other steps or units not expressly listed or inherent to such a process, method, product, or device. In addition, "and/or" used in the description and the claims means at least one of the connected objects. For example, A and/or B represents the following three cases: Only A exists, only B exists, and both A and B exist.

In the embodiments of the present disclosure, the term such as "exemplary" or "for example" is used to represent an example, an instance, or a description. Any embodiment or design solution described as "exemplary" or "for example" in the embodiments of the present disclosure should not be construed as being more preferred or advantageous than other embodiments or design solutions. Exactly, use of the word such as "exemplary" or "example" is intended to present a concept in a specific manner.

Embodiments of the present disclosure will be described below with reference to the accompanying drawings. An information transmission method and a communications device provided in the embodiments of the present disclosure may be applied to a wireless communications system. The wireless communications system may be a 5G system, an evolved Long Term Evolution (eLTE) system, or a subsequent evolved communications system.

In the embodiments of the present disclosure, time-sensitive can also be referred to as periodic deterministic. Time-sensitive communication can also be referred to as periodic deterministic communication. The time-sensitive data stream can also be referred to as a periodic deterministic data stream. An example of a time-sensitive network technology is IEEE Time-Sensitive Network (TSN). Periodic deterministic communication uses a transfer interval as a period for data transmission.

Figure 1:
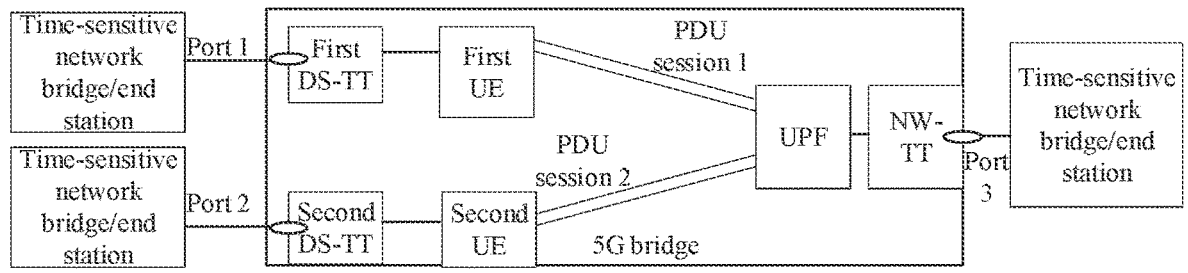
FIG. 1 is a schematic architectural diagram of an applicable wireless communications system according to an embodiment of the present disclosure.

FIG. 1 is a schematic architectural diagram of an applicable wireless communications system according to an embodiment of the present disclosure. In the embodiments of the present disclosure, a transmit end of the time-sensitive data stream is called a talker, and a receive end of the time-sensitive data stream is called a listener. One or multiple bridges are used between the talker and the listener for data forwarding. An end station node can be a talker or a listener. A bridge is responsible for data transmission between a talker and a listener.

The terminal (e.g., User Equipment (UE)), the time-sensitive translator, and the wireless communication network constitute a bridge (the 5G bridge will be used as an example in the following). For downlink data, a port of a Device-Side TSN Translator (DS-TT) can be an egress port of data, and a port of a NetWork-side TSN Translator (NW-TT) is an ingress port of data. For uplink data, a NW-TT port can be an ingress port of data, and a DS-TT port is an egress port of data. The terminal can be co-located with the DS-TT. A User Plane Function (UPF) can be co-located with the NW-TT.

As shown in FIG. 1, one terminal can be connected to one or more DS-TTs, and one DS-TT can have one or more ports. One 5G bridge can have one UPF, and one or more ports can be enabled on the NW-TT of the UPF. The terminal can act as a proxy of the DS-TT port and establish a Protocol Data Unit (PDU) session with the UPF. Through the PDU session, the DS-TT port is associated with the NW-TT port co-located with the UPF. The DS-TT port becomes a port of the 5G bridge.

Both the DS-TT port and the NW-TT port can be connected separately to a TSN bridge and/or an end station. Through the 5G bridge, the TSN bridge and/or the end station connected to the port of the TT can perform communication.

It should be noted that FIG. 1 is only a schematic diagram of an example. In the embodiments of the present disclosure, the structure of the 5G bridge and the connection relationship between ports in the 5G bridge are not limited.

To support implementation of the bridge formed by the terminal, the time-sensitive translator, and the wireless communication network, the following problems need to be solved.

Problem 1: One DS-TT port and multiple NW-TT ports can form a port pair. For example, ports on the DS-TT side are multiple ports A1 and A2. For example, there are multiple ports B1, B2, and B3 on the NW-TT. In this case, the port pair can be [A1, B1], [A1, B2], [A1, B3], [A2, B1], [A2, B2], and [A3, B3]. At present, an Application Function (AF) calculates delays of different port pairs, and the delay of a port pair is the time required for a packet to transmit from one port of the port pair to another port. It can be understood that there can be three types of port pairs: a port pair formed by two DS-TT ports, a port pair formed by one DS-TT port and one NW-TT port, and a port pair formed by two NW-TT ports. It can be understood that the delays of the three types of port pairs are calculated in different manners. Therefore, to form a port pair and determine the delay of the port pair, the type of the TT of the port is required. However, currently, an AF does not distinguish between a DS-TT port and a NW-TT port.

Problem 2: When calculating the delay of a port pair formed by a DS-TT port and a NW-TT port, the processing time between the terminal and the DS-TT port (UE to DS-TT residence time) is added to a Packet Delay Budget (PDB).

The processing time between the terminal and the DS-TT port is the delay of transmitting the packet between the DS-TT port and the terminal and is related to the DS-TT port. A Packet Delay Budget (PDB) is the time taken to transmit a packet between the terminal and the NW-TT port and should be related to the NW-TT port. At present, the PDB is the same for NW-TT ports. In an implementation manner, the same PDB is configured for each NW-TT port, that is, the time taken to transmit a packet between the terminal and any NW-TT port is the same. In another implementation manner, different PDBs are configured for NW-TT ports.

Problem 3: Different packets received from one NW-TT port may be sent to different DS-TT ports. Different DS-TT packets correspond to different PDU sessions, and Session Management Functions (SMFs) of different PDU sessions may be different. The NW-TT currently lacks information in selection of a DS-TT port. The UPF also lacks information in selection of a PDU session corresponding to a DS-TT port.

Problem 4: Currently, the NW-TT port is not associated with and should not be associated with a PDU session of the DS-TT. This is because different packets received from one NW-TT port may be sent to different DS-TT ports; and different packets received from one DS-TT port may also be sent to different NW-TT ports. However, at present, the port related information of the NW-TT port is sent through related signaling of the PDU session related to the DS-TT port. For example, the UPF sends the port related information of the NW-TT port to the SMF of the PDU session related to the DS-TT port, and the SMF sends the port related information of the NW-TT port to the Policy Control Function (PCF) of a PDU session policy related to the DS-TT port. The PCF then sends the port related information of the NW-TT port to the AF.

When the DS-TT is not connected, the port related information of the NW-TT cannot be sent to the AF when generated or updated. Therefore, the port related information of the NW-TT is forwarded after the PDU session of the DS-TT is established.

In the embodiments of the present disclosure, for example, an action of obtaining may be understood as generation, obtaining by a configuration, obtaining through receiving, obtaining after receiving by a request, obtaining through self-learning, obtaining through inferring based on information that is not received, or obtaining after processing based on received information. This may be specifically determined based on an actual requirement, and is not limited in the embodiments of the present disclosure. For example, when specific capability indication information sent by a device is not received, it may be inferred that the device does not support the capability.

In some embodiments, an action of sending may include broadcasting, broadcasting in a system message, and returning after responding to a request.

In some embodiments, pre-configuration can be referred to as default.

In an embodiment of the present disclosure, the port management container may also be referred to as a port management information container. The port management container is a container that carries port control information (also referred to as port management information).

In an embodiment of the present disclosure, the port related information includes: a port management container. In an embodiment of the present disclosure, the port related information may be understood as any one or more pieces of port information in bridge management (for example, port related configuration information in bridge management in 802.1Q).

In an embodiment of the present disclosure, the port may be one of the following: an Ethernet port and an IP port.

In an embodiment of the present disclosure, the data channel may include, but is not limited to one of the following: a PDU session, a PDN connection, a QoS flow, a bearer, and an Internet Protocol security (IPsec) channel, where the bearer may be an Evolved Radio Access Bearer (E-RAB), a Radio Access Bearer (RAB), a Data Radio Bearer (DRB), a Signaling Radio Bearer (SRB), or the like.

In an embodiment of the present disclosure, a port pair is formed by two ports, for example: formed by two ports of the same DS-TT, or formed by two ports of different DS-TTs, or formed by two ports of the same NW-TT, or formed by two ports of different NW-TTs.

In an embodiment of the present disclosure, the delay of a port pair (also referred to as a bridge delay of a port pair) may refer to the time taken for a packet to transmit from one port to another port. The two ports may be two ports of the same bridge (for example, a 5G bridge). It can be understood that the bridge delay can be the time taken for a packet to pass through the bridge.

For example, a first port pair is formed by a first port and a second port, and the delay of the port pair may refer to the time taken for a packet to transmit from the first port to the second port.

In an embodiment of the present disclosure, the delay of a port pair may be a bridge delay per traffic class (per traffic class). Each port can support one or more traffic classes. The transmission performance of each traffic class is different. Therefore, it can be understood that each traffic class of an egress port has the delay of the port pair. The delays of port pairs of each traffic class can be different.

That is, the port delay may also refer to the bridge delay of a specific traffic class. Certainly, the bridge delays of different traffic classes may be the same or different.

In an embodiment of the present disclosure, the TT port, the port of the TT, the port on the TT, the port on the TT side, and the TT side port represent the same meaning and may be used in combination.

In an embodiment of the present disclosure, the DS-TT port and the port of the DS-TT both represent ports on the DS-TT and can be used in combination. In an embodiment of the present disclosure, the NW-TT port and the port of the NW-TT both represent the ports on the NW-TT and can be used in combination.

In an embodiment of the present disclosure, a DS-TT port may also be equivalent to a device-side port; and a NW-TT port may also be equivalent to a network-side port. When the type of the TT of the port is DS-TT, it can be equivalent to that the port is a device-side port; when the type of the TT of the port is NW-TT, it can be equivalent to that the port is a network-side port.

In an embodiment of the present disclosure, the related information of the TT on which the first port is located may be simply referred to as the related information of the TT of the first port or the TT related information of the first port.

In an embodiment of the present disclosure, the data channel corresponding to the port is generally associated with a DS-TT port.

In an embodiment of the present disclosure, the wireless communication network may be simply referred to as a network.

In an embodiment of the present disclosure, the wireless communication network may be at least one of the following: a public network and a non-public network.

In an embodiment of the present disclosure, the non-public network may be referred to as one of the following: a non-public communications network. The non-public network may include at least one of the following deployment modes: a non-public network (such as an SNPN) of stand-alone networking, and a non-public network of non-stand-alone networking (such as a Closed Access Group (CAG)). In an embodiment of the present disclosure, the non-public network may include or be referred to as a private network. A private network may be referred to as one of the following: a private communication network, a private network, a Local Area Network (LAN), a Private Virtual Network (PVN), an isolated communication network, a dedicated communication network, or other names. It should be noted that, in the embodiments of the present disclosure, the naming manner is not specifically limited.

In an embodiment of the present disclosure, the public network may be referred to as one of the following: a public communications network or another name. It should be noted that, in the embodiments of the present disclosure, the naming manner is not specifically limited.

In an embodiment of the present disclosure, a communications device may include at least one of the following: a communications network element and a terminal.

In an embodiment of the present disclosure, a communications network element may include at least one of the following: a network element of a core network and a network element of a radio access network.

In the embodiments of the present disclosure, a network element of a core network (e.g., a Core Network (CN) network element) may include, but is not limited to, at least one of the following: a CN device, a CN node, a CN function, a CN network element, a Mobility Management Entity (MME), an Access Management Function (AMF), a Session Management Function (SMF), a User Plane Function (UPF), a Serving GateWay (SGW), a PDN gateway, a Policy Control Function (PCF), a Policy and Charging Rules Function (PCRF), a Serving GPRS Support Node (SGSN), a Gateway GPRS Support Node (GGSN), a Unified Data Management (UDM), a Unified Data Repository (UDR), a Home Subscriber Server (HSS), and an Application Function (AF), and a Centralized Network Configuration (CNC).

In the embodiments of the present disclosure, a network element of a Radio Access Network (RAN) may include but is not limited to at least one of the following: a radio access network device, a radio access network node, a radio access network function, a radio access network unit, a Third Generation Partnership Project (3GPP) radio access network, a non-3GPP radio access network, a Centralized Unit (CU), a Distributed Unit (DU), a base station, an evolved NodeB (eNB), a 5G base station (gNB), a Radio Network Controller (RNC), a NodeB, a Non-3GPP InterWorking Function (N3IWF), an Access Controller (AC) node, an Access Point (AP) device, a Wireless Local Area Network (WLAN) node, and an N3IWF.

The base station may be a Base Transceiver Station (BTS) in a Global System for Mobile communications (GSM) or Code Division Multiple Access (CDMA), or may be a NodeB (NB) in Wideband Code Division Multiple Access (WCDMA), or may be an eNB in LTE, or a gNB in 5G. The embodiments of the present disclosure are not limited thereto.

In the embodiments of the present disclosure, UE is a terminal. The terminal may include a relay that supports a terminal function and/or a terminal that supports a relay function. The terminal may also be referred to as a terminal device or UE. The terminal may be a terminal side device such as a mobile phone, a tablet personal computer, a laptop computer, a Personal Digital Assistant (PDA), a Mobile Internet Device (MID), a wearable device, or an in-vehicle device. It should be noted that a specific type of the terminal is not limited in embodiments of the present disclosure.

The method and the communications device provided in the embodiments of the present disclosure may be applied to a wireless communications system. The wireless communications system may be a fifth-generation (5G) system, an Evolved Packet System (EPS), or a subsequent evolved communications system. The wireless communication network in the embodiments of the present disclosure may be a fifth-generation mobile communication network (5GS) or an LTE network. The following clearly and completely describes the technical solutions in the embodiments of the present disclosure with reference to the accompanying drawings in the embodiments of the present disclosure. Apparently, the described embodiments are some rather than all of the embodiments of the present disclosure. All other embodiments obtained by a person of ordinary skill in the art based on the embodiments of the present disclosure without creative efforts shall fall within the protection scope of the present disclosure.

The following describes the information transmission method in the embodiments of the present disclosure.

Figure 2:
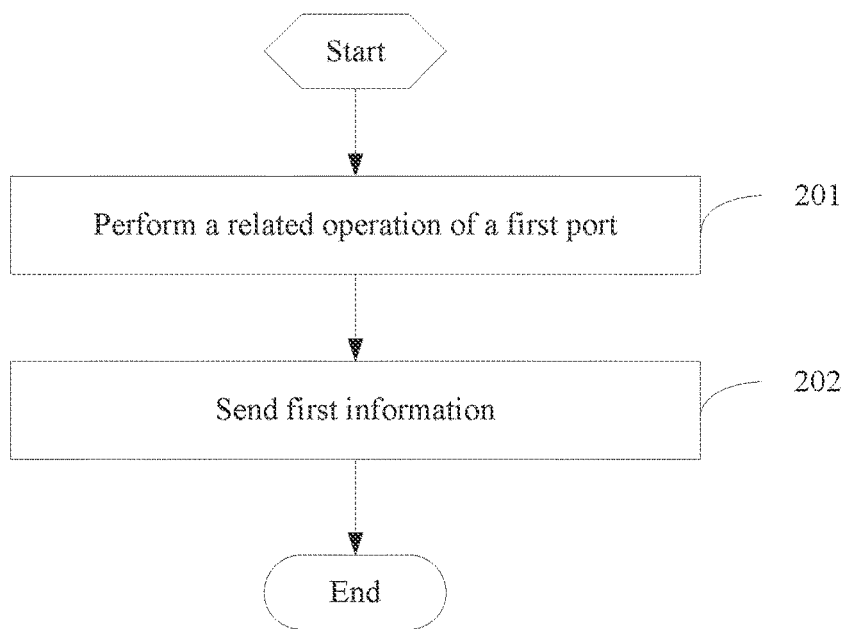
FIG. 2 is a flowchart of an information transmission method according to an embodiment of the present disclosure.

Referring to FIG. 2, an embodiment of the present disclosure provides an information transmission method, applied to a first communications device. The first communications device includes, but is not limited to a terminal, a TT (such as one of the following: a DS-TT, a NW-TT, a first DS-TT, a second DS-TT, a first NW-TT, and a second NW-TT), a CN network element (such as one of the following: an SMF, a UPF, a PCF, a NEF, and an AF), and a RAN network element.

The method includes:

Step 201: Perform a related operation of a first port.

Step 202: Send first information.

The related operation of the first port includes at least one of the following: obtaining port related information of the first port, determining related information of a TT of the first port, and determining delay related information of the first port.

The first information includes at least one of the following: the port related information of the first port, the related information of the TT of the first port, and the delay related information of the first port.

The first port is a port of a TT.

In an implementation manner, the first port may be a DS-TT port or a NW-TT port.

In an implementation manner, the first port may be an ingress port, or may be an egress port. That is, data is received from the first port, or data is sent from the first port.

In an implementation manner, the port related information of the first port may be a port management container including the information of the first port.

In an implementation manner, for example, the port related information of the first port includes at least one of the following:

related information of a TT of the first port, and delay related information of the first port.

In another implementation manner, for example, the port related information of the first port does not include at least one of the following:

related information of a TT of the first port, and delay related information of the first port.

In an implementation manner, the obtained first information may include related information of the TT of the first port. The first communications device only forwards the first information. In another implementation manner, the obtained first information does not include related information of the TT of the first port. The first communications device may determine the related information of the TT of the first port, and when sending the first information, simultaneously send the related information of the TT of the first port.

In an implementation manner, the obtained first information may include delay related information of the first port. The first communications device only forwards the first information. In another implementation manner, the obtained first information does not include delay related information of the first port. The first communications device may determine the delay related information of the first port, and when sending the first information, simultaneously send the delay related information of the first port.

In an implementation manner, the delay related information of the first port may be understood as the delay of the first port.

In some embodiments, the related information of the TT includes at least one of the following: a type of the TT, identification information of the TT, and serial number information of the TT.

In some embodiments, the type of the TT is: DS-TT or NW-TT.

In an implementation manner, if the type of the TT is DS-TT, the first port is a DS-TT port, and if the type of the TT is NW-TT, the first port is a NW-TT port.

In an implementation manner, the identification information of the TT may be information used to identify the TT, and different TTs have different identification information.

The serial number information of the TT may be the serial number of the TT.

In some embodiments, the delay related information of the first port includes at least one of the following:

a PDB and/or traffic information corresponding to the PDB; and a processing time between a terminal and a DS-TT and/or a traffic class corresponding to the processing time.

In an implementation manner, the PDB is a PDB corresponding to the traffic class.

In some embodiments, the PDB includes a PDB per traffic class of the first port.

In an implementation manner, when the delay related information of the first port includes a PDB, it may be determined that the type of the TT of the first port is NW-TT. In another implementation manner, when the delay related information of the first port includes the processing time between the terminal and the DS-TT, it can be determined that the type of the TT of the first port is DS-TT.

Further, before the step of sending the first information, at least one of the following is performed:
determining related information of a TT of the first port, and
determining delay related information of the first port.

In an implementation manner, after the step of obtaining the port related information of the first port, before the step of sending the first information, at least one of the following is performed:
determining related information of the TT of the first port; and
determining delay related information of the first port.

It can be understood that when the first communications device is an SMF, the first information can be received from the terminal, and it is determined that the type of the TT of the first port is DS-TT; or the first information can be received from the UPF, and it is determined that the type of the TT of the first port is NW-TT.

In an implementation manner, when it is determined that the first port is a DS-TT port, it may be determined that the delay related information of the first port includes the processing time between the terminal and the DS-TT. When it is determined that the first port is a NW-TT port, it may be determined that the delay related information of the first port includes a PDB.

In some embodiments, the sending first information includes at least one of the following:
sending the first information, where the first information is included inside a port management container;
sending the first information, where the first information is included outside a port management container;
sending the first information, where a part of the first information is included inside a port management container, and another part of the first information is included outside the port management container;
sending the first information, where the first information is included inside a first container; and
sending the first information, where the first information is included inside a second container; where
the first container is used to transmit port related information of a DS-TT port and/or related information of a DS-TT; and
the second container is used to transmit port related information of a NW-TT port and/or related information of a NW-TT.

(1) In an implementation manner, the port related information of the first port does not include related information of the TT of the first port. After the related information of the TT of the first port is determined, the port related information of the first port and the related information of the TT of the first port are sent. For example, when the SMF sends the port related information of the first port to the PCF or the PCF sends the port related information of the first port to the AF, the type of the TT of the first port is additionally included.

In another implementation manner, the port related information of the first port does not include the delay related information of the first port. After the delay related information of the first port is determined and/or the related information of the TT of the first port is determined, the port related information of the first port and the delay related information of the first port are sent. For example, when the SMF sends the port related information of the first port to the PCF or the PCF sends the port related information of the first port to the AF, the delay related information of the first port is additionally included.

In another implementation manner, the port related information of the first port includes related information of the TT of the first port and/or delay related information of the first port. The port related information of the first port may be sent. For example, the SMF sends the received port related information of the first port to the PCF; and the PCF sends the port related information of the first port to the AF.

(2) In an implementation manner, when sending the port related information of the first port, the port related information of the first port is included inside a port management container of the first port, or is included outside the port management container of the first port.

In another implementation manner, the port related information of the first port is included inside the port management container of the first port, and the related information of the TT of the first port is included outside the port management container of the first port.

In another implementation manner, the port related information of the first port is included in the port management container of the first port, and the delay related information of the first port is included outside the port management container of the first port.

In another implementation manner, the related information of the TT of the first port is included inside the port management container of the first port.

In another implementation manner, the delay related information of the first port is included inside the port management container of the first port.

(3) In an implementation manner, the port related information of the first port includes related information of the TT of the first port. When sending the port related information of the first port, it is indicated in the port management container whether the type of the TT of the port is DS-TT or NW-TT.

(4) In an implementation manner, when sending the port related information of the first port, the port related information of the first port is included inside a first container (such as a port management container of a type A), to indicate that the type of the TT of the port is DS-TT. The first container (such as a port management container of a type A) is used to transmit the port related information of the DS-TT port and/or the related information of the DS-TT. In another implementation manner, when sending the port related information of the first port, the port related information of the first port is included inside a second container (such as a port management container of a type B), to indicate that the type of the TT of the port is NW-TT. The second container (such as a port management container of a type B) is used to transmit the port related information of the NW-TT port and/or the related information of the NW-TT.

In an implementation manner, the first communications device is a DS-TT and can send the first information to the terminal. For example, the first port is a DS-TT port.

In an implementation manner, the port related information of the first port sent by the DS-TT includes related information of the TT of the first port.

In another implementation manner, the port related information of the first port sent by the DS-TT does not include the related information of the TT of the first port.

In another implementation manner, the first communications device is a NW-TT and can send the first information to the UPF. For example, the first port is a NW-TT port.

In an implementation manner, the port related information of the first port sent by the NW-TT includes related information of the TT of the first port.

In another implementation manner, the port related information of the first port sent by the NW-TT does not include the related information of the TT of the first port.

In another implementation manner, the first communications device is a terminal or a UPF, and can send the first information to the SMF.

In another implementation manner, the first communications device is an SMF, and can send the first information to the PCF. For example, the SMF obtains the port related information of the first port, and after determining the related information of the TT of the first port (for example, determines the type of the TT of the first port), sends the port related information of the first port and the related information of the TT of the first port to the PCF.

For example, the SMF obtains the port related information of the first port, and after determining the delay related information of the first port, sends the port related information of the first port and the delay related information of the first port to the PCF. In another implementation manner, the first communications device is a PCF and can send the first information to the AF.

In the embodiments of the present disclosure, the related operation of the first port is performed; and the first information is sent; where the related operation of the first port includes at least one of the following: obtaining the port related information of the first port, determining the related information of the TT of the first port, and determining the delay related information of the first port; the first information includes at least one of the following: the port related information of the first port, the related information of the TT of the first port, and the delay related information of the first port; and the first port is a port of a TT. Therefore, this can support the construction of a port pair and the calculation of the delay of the port pair, to support the management and control of time-sensitive bridge related information.

Figure 3:
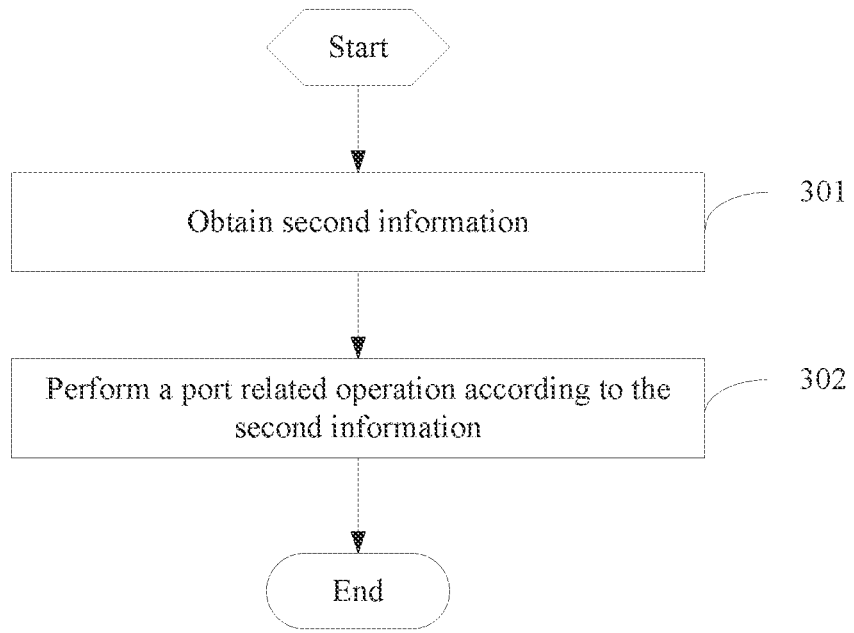
FIG. 3 is a flowchart of another information transmission method according to an embodiment of the present disclosure.

Referring to FIG. 3, an embodiment of the present disclosure provides an information transmission method, applied to a second communications device. The second communications device includes, but is not limited to a terminal, a TT (such as one of the following: a DS-TT, a NW-TT, a first DS-TT, a second DS-TT, a first NW-TT, and a second NW-TT), a CN network element (such as one of the following: an SMF, a UPF, a PCF, a NEF, and an AF), and a RAN network element. The method includes:

Step 301: Obtain second information.

Step 302: Perform a port related operation according to the second information.

The second information includes at least one of the following: first information (the first information includes at least one of the following: port related information of a first port, related information of a TT of the first port, and delay related information of the first port), a first container, a second container, and a data channel MAC address.

The first port is a port of a TT.

For the first information, the first port, the port related information of the first port, the related information of the TT of the first port, the delay related information of the first port, the first container, and the second container, refer to corresponding descriptions of the embodiment shown in FIG. 2. Details are not repeated herein.

Exemplarily, the first container (such as a port management container of a type A) is used to transmit port related information of a DS-TT port and/or related information of a DS-TT. The second container (such as a port management container of a type B) is used to transmit the port related information of the NW-TT port and/or the related information of the NW-TT.

Exemplarily, the port related information of the first port includes, but is not limited to at least one of the following:
related information of the TT of the first port; and
delay related information of the first port.

Exemplarily, in another implementation manner, the port related information of the first port does not include at least one of the following:
related information of the TT of the first port; and
the delay related information of the first port.

In some embodiments, the related information of the TT includes at least one of the following: a type of the TT, identification information of the TT, and serial number information of the TT.

In some embodiments, the type of the TT is:
DS-TT or NW-TT.

In some embodiments, the delay related information of the first port includes at least one of the following:
a PDB and/or traffic information corresponding to the PDB; and
a processing time between a terminal and a DS-TT and/or a traffic class corresponding to the processing time.

In some embodiments, the PDB includes a PDB per traffic class of the first port.

For the port related information of the first port, refer to the corresponding description in the embodiment shown in FIG. 2. Details are not described herein again.

In some embodiments, the obtaining the second information includes: obtaining the first information.

The first information includes at least one of the following: the port related information of the first port, the related information of the TT of the first port, and the delay related information of the first port.

Further, the obtaining the first information may include one of the following: obtaining the first information, where the first information is contained inside a port management container;
obtaining the first information, where the first information is included outside a port management container;
obtaining the first information, where a part of the first information is included inside a port management container, and another part of the first information is included outside the port management container;
obtaining the first information, where the first information is included inside a first container; and
obtaining the first information, where the first information is included inside a second container; where
the first container is used to transmit port related information of a DS-TT port and/or related information of a DS-TT; and
the second container is used to transmit port related information of a NW-TT port and/or related information of a NW-TT.

For obtaining of the port information of the first port, refer to the corresponding description in the embodiment shown in FIG. 2. Details are not described herein again.

In some embodiments, the port related operation includes at least one of the following:
determining a type of the TT of the first port;
constructing a port pair; and
determining delay related information of the port pair.

In an implementation manner, constructing a port pair may be combining ports into a port pair.

In an implementation manner, the delay related information of the port pair may be understood as the bridge delay of the port pair.

In some embodiments, the determining the type of the TT of the first port includes one of the following:

it can be determined that the type of the TT of the first port is DS-TT according to the port related information of the first port included inside the first container;

it can be determined that the type of the TT of the first port is NW-TT according to the port related information of the first port included inside the second container;

the type of the TT of the first port can be determined according to the related information of the TT of the first port in the second information;

the type of the TT of the first port can be determined according to the TT related information of the first port in the delay of the first port;

when the delay related information of the first port includes a PDB, it may be determined that the type of the TT of the first port is DS-TT; in another implementation manner;

when the delay related information of the first port includes the processing time between the terminal and the DS-TT, it may be determined that the type of the TT of the first port is NW-TT;

based on a MAC address of the first port and a MAC address of a data channel, when the MAC address of the first port is the MAC address of the data channel, it can be determined that the type of the TT of the first port is DS-TT; and based on a MAC address of the first port and a MAC address of a data channel, when the MAC address of the first port is not the MAC address of the data channel, it can be determined that the type of the TT of the first port is NW-TT.

It can be understood that the data channel is associated with a DS-TT, and the MAC address of the data channel is the MAC address of the DS-TT port. Therefore, it can be determined that the type of the TT of the first port corresponding to the MAC address of the data channel is DS-TT. The data channel is not associated with a NW-TT. Therefore, it can be determined that the type of the TT of the first port that does not correspond to the MAC address of the data channel is NW-TT.

In some embodiments, the constructing a port pair includes at least one of the following:

constructing a port pair including the first port;
constructing a first-type port pair;
constructing a second-type port pair; and
constructing a third-type port pair; where
the port pair including the first port includes at least one of the following:
a NW-TT port and a DS-TT port, where the first port is a port of the NW-TT port or the DS-TT port; or
two NW-TT ports, where the first port is a port of the two NW-TT ports; or
two DS-TT ports, where the first port is a port of the two DS-TT ports;
the first-type port pair is a port pair formed by a NW-TT port and a DS-TT port;
the second-type port pair is a port pair formed by a first DS-TT port and a second DS-TT port; and
the third-type port pair is a port pair formed by a first NW-TT port and a second NW-TT port.

In an implementation manner, the second communications device (such as an AF or an SMF) may construct at least one port pair according to the type of the TT of the port: a first port pair formed by [NW-TT port and DS-TT port], a second port pair formed by [DS-TT port 1 and DS-TT port 2], and a third port pair formed by [NW-TT port 1 and NW-TT port 2]. The first port pair may be a port pair formed by any NW-TT port and any DS-TT port, the second port pair may be a port pair formed by any two DS-TT ports, and the third port pair may be a port pair formed by any two NW-TT ports.

In some embodiments, the determining the delay related information of the port pair includes at least one of the following:

determining delay related information of the port pair including the first port;
determining delay related information of the first-type port pair;
determining a delay of the second-type port pair; and
determining a delay of the third-type port pair; where
the first-type port pair is a port pair formed by a NW-TT port and a DS-TT port;
the second-type port pair is a port pair formed by a first DS-TT port and a second DS-TT port; and
the third-type port pair is a port pair formed by a first NW-TT port and a second NW-TT port.

In an implementation manner, the delay related information of the port pair may be referred to as the bridge delay of the port pair.

For example, in the implementation of constructing a port pair and determining the delay related information of the port pair, the first DS-TT and the second DS-TT are the same DS-TT; or the first DS-TT and the second DS-TT are different DS-TTs, and the first DS-TT and the second DS-TT access a network through a same terminal; or the first DS-TT and the second DS-TT are different DS-TTs, and the first DS-TT and the second DS-TT access a network through different terminals.

In an implementation manner, the ports of the same DS-TT are constructed as a port pair.

In an implementation manner, DS-TT ports that are of different DS-TTs but access a network through the same terminal are constructed as a port pair, for example: a first port of a first DS-TT and a second port of a second DS-TT are constructed as a port pair.

In an implementation manner, DS-TT ports that are of different DS-TTs and access a network through different terminals are constructed as a port pair, for example, a first port of a first DS-TT and a second port of a second DS-TT are constructed as a port pair.

In an implementation manner, the delay related information of the first-type port pair is the processing delay between the DS-TT port and the terminal+the PDB related to the NW-TT port.

In an implementation manner, the delay related information of the second-type port pair is the processing delay between the first DS-TT port and the first terminal+the first PDB+the processing delay between the second DS-TT port and the second terminal+the second PDB.

In another implementation manner, when the first DS-TT and the second DS-TT access a network through the same UE, the delay related information of the second-type port pair is the processing delay between the first DS-TT port and the first terminal+the processing delay between the second DS-TT port and the second terminal.

In another implementation manner, when the first DS-TT and the second DS-TT are the same DS-TT, the delay related information of the second-type port pair is a transmission delay between the first DS-TT port and the second DS-TT port.

In an implementation manner, the delay related information of the third-type port pair is a transmission delay between the first NW-TT port and the second NW-TT port.

In an implementation manner, the second communications device is an AF and can obtain the second information from the PCF.

In another implementation manner, the second communications device is a PCF, and can obtain the second information from the SMF.

In another implementation manner, the second communications device is an SMF, and can obtain the second information from the UE or the UPF.

In the embodiments of the present disclosure, the port related operation is performed according to the second information. Therefore, this can support the construction of a port pair and the calculation of the delay of the port pair, to support the management and control of time-sensitive bridge related information.

Figure 4:
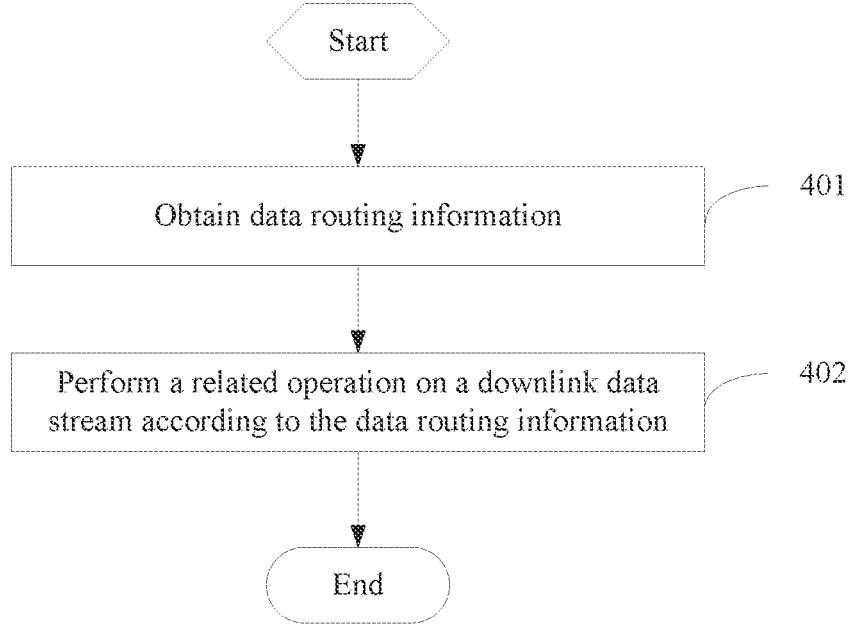
FIG. 4 is a flowchart of another information transmission method according to an embodiment of the present disclosure.

Referring to FIG. 4, an embodiment of the present disclosure further provides an information transmission method, applied to a third communications device. The third communications device includes, but is not limited to: a terminal, a DS-TT, a NW-TT, a CN network element (such as one of the following: an SMF, a UPF, a PCF, a NEF, and an AF), and a RAN network element. The method includes:

Step 401: Obtain data routing information, where the data routing information includes at least one of the following: data stream identification information and port related information.

Step 402: Perform a related operation on a downlink data stream according to the data routing information.

In an implementation manner, the third communications device is a NW-TT or a UPF.

In an implementation manner, the data routing information is related to the downlink data stream, for example, the data routing information is at least one of data routing information and packet header information of the downlink data stream.

In an implementation manner, the data stream identification information includes at least one of the following: a target MAC address and a VLAN identifier.

In an implementation manner, the data routing information is static filter entry information.

In an implementation manner, the port related information may be a port map, and the port map includes, but is not limited to an egress port and a port operation (forwarding or blocking).

In some embodiments, the performing a related operation on the downlink data stream includes at least one of the following:
  selecting a DS-TT port to send the downlink data stream;
  selecting a data channel to send the downlink data stream, where the data channel is a data channel corresponding to a DS-TT port; and
  performing a port operation on the downlink data stream.

In an implementation manner, the data communication is a PDU session.

In an implementation manner, the selecting a data channel may be selecting a PDU session corresponding to the DS-TT port according to the data routing information.

In some embodiments, the port operation includes:
  forwarding or blocking.

In an implementation manner, the downlink data stream is forwarded, and the transmission of the downlink data stream is blocked.

In this embodiment, a related operation is performed on the downlink data stream according to the data routing information, to process the downlink data stream in the time-sensitive bridge, thereby supporting management and control of time-sensitive bridge related information.

Figure 5:
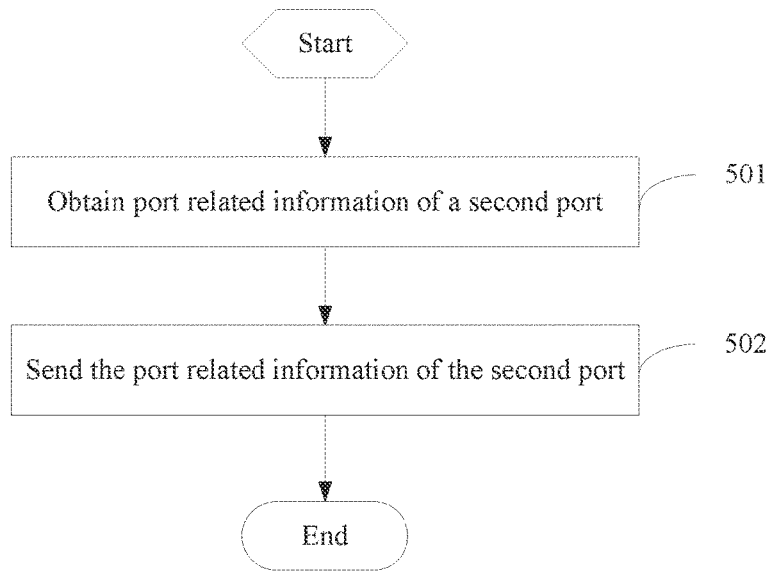
FIG. 5 is a flowchart of another information transmission method according to an embodiment of the present disclosure.

Referring to FIG. 5, an embodiment of the present disclosure also provides an information transmission method, applied to a fourth communications device. The fourth communications device includes, but is not limited to: a terminal, a DS-TT, a NW-TT, a CN network element (such as one of the following: an SMF, a UPF, a PCF, a NEF, and an AF), and a RAN network element. The method includes:

Step 501: Obtain port related information of a second port.

Step 502: Send the port related information of the second port.

The second port is a NW-TT port (that is, located on a NW-TT).

In an implementation manner, the second port may be an ingress port, or may be an egress port. That is, data is received from the second port, or data is sent from the second port.

In an implementation manner, the fourth communications device is a NW-TT or a UPF.

In an implementation manner, the port related information of the second port includes, but is not limited to at least one of the following: a port management information container including second port information, a port number, a bridge identifier, a port address (such as a MAC address and/or an IP address), related information of the TT of the second port, and delay related information of the second port.

In an implementation manner, the port related information of the second port includes, but is not limited to at least one of the following:
  related information of the TT of the second port; and
  the delay related information of the second port.

In an implementation manner, the related information of the TT includes at least one of the following: identification information of the TT, and serial number information of the TT.

In an implementation manner, for example, the delay related information of the second port includes at least one of the following:
  a PDB and/or traffic information corresponding to the PDB; and
  a processing time between a terminal and a DS-TT and/or a traffic class corresponding to the processing time.

In some embodiments, in a case that a first condition is met, the sending the port related information of the second port includes:
  selecting any data channel and sending the port related information of the second port to a communications device related to the selected data channel; where
  the first condition includes one of the following:
  at least one data channel exists within the bridge; and
  at least one data channel established with the fourth communications device exists.

In an implementation manner, data communication may be a PDU session or bearer or the like.

In an implementation manner, if at least one PDU session exists in the bridge, any data channel is selected and the port related information of the second port is sent to a communications device related to the selected data channel, for example: the port related information of the second port is sent to the SMF or the PCF. If at least one PDU session established with the fourth communications device exists, the port related information of the second port is sent to any SMF or PCF.

In some embodiments, the selected communications device includes:
  a communications device related to any data channel; or
  any communications device within the bridge; or a communications device related to any data channel established with the fourth communications device; or a default communications device.

In an implementation manner, an SMF or a PCF related to any PDU session may be selected and port related information of the second port may be sent to the selected SMF or PCF.

In an implementation manner, an SMF or a PCF related to any PDU session in the bridge may be selected and port related information of the second port may be sent to the selected SMF or PCF.

In an implementation manner, an SMF or a PCF related to any PDU session established with the fourth communications device may be selected and the port related information of the second port may be sent to the selected SMF or PCF.

In some embodiments, in a case that a second condition is met, the sending the port related information of the second port includes:
  sending the port related information of the second port after at least one data channel is established; or
  sending the port related information of the second port to any communications device or a default communications device within a bridge; where
  the second condition includes one of the following:
  no data channel exists within the bridge; and
  no data channel established with the fourth communications device exists.

In an implementation manner, when no PDU session related to the DS-TT port exists, the port related information of the second port is sent to the SMF after a PDU session related to at least one DS-TT port is established.

In an implementation manner, if no PDU session established with the fourth communications device exists, the port related information of the second port is sent to any SMF or PCF or a default SMF or PCF.

In some embodiments, the data channel includes:
  a data channel related to a DS-TT port.

In an implementation manner, the data channel is a PDU session related to a DS-TT port.

In this embodiment of the present disclosure, the port related information of the second port is obtained, and the port related information of the second port is sent. Therefore, transmission of the port related information of the second port can be supported, to achieve the beneficial effect of supporting the management and control of bridge related information.

The method provided by the embodiments of the present disclosure is described below in conjunction with specific embodiments:

Embodiment 1

Figure 6:
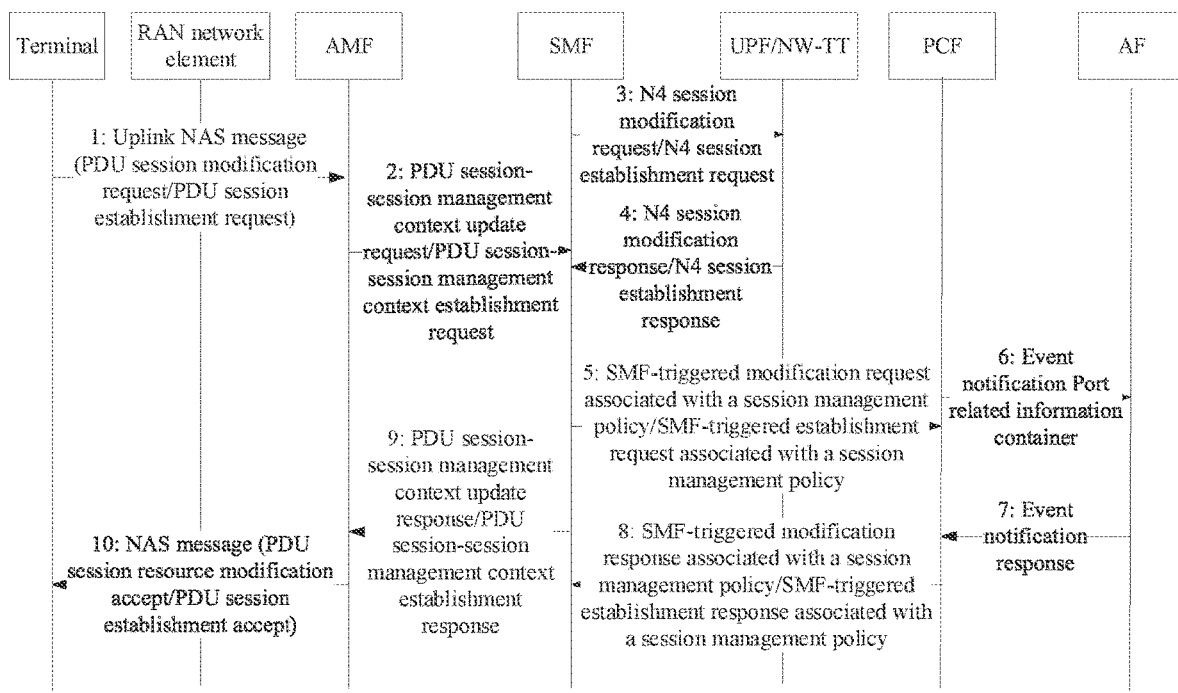
FIG. 6 is a schematic diagram of another application scenario according to an embodiment of the present disclosure.

This embodiment is shown in FIG. 6 and includes the following steps:

Step 1: The UE requests to establish a PDU session related to a DS-TT port.

In the PDU session establishment request or a PDU session modification request, port related information of the DS-TT port is indicated, for example, related information of a TT of the DS-TT port. The related information of the TT includes at least one of the following: a type of the TT, a serial number of the TT (such as a DS-TT serial number), and an identifier of the TT (such as a DS-TT identifier). The DS-TT serial number can be used to distinguish different DS-TTs. For example, a port associated with a TT serial number 1 of a DS-TT of the port and a port associated with a TT serial number 2 of a DS-TT of the port belong to different DS-TTs.

The related information of the TT may be included inside the port management information container or outside the port management information container.

Step 2: The AMF sends a PDU session modification request message or a PDU session establishment request message to the SMF. In some embodiments, the request message includes port related information of the DS-TT port. In an implementation manner, the type of the TT in the port related information of the DS-TT port is DS-TT.

Step 3: The SMF sends an N4 session modification request message or an N4 session establishment request message to the UPF.

Step 4: The UPF sends an N4 session modification response message or an N4 session establishment response message to the SMF.

In some embodiments, the response message includes port related information of the NW-TT port. In an implementation manner, the type of the TT in the port related information of the NW-TT port is NW-TT.

Step 5: The SMF sends a modification request message associated with a session management policy triggered by the SMF or an establishment request message associated with a session management policy triggered by the SMF to the PCF. In some embodiments, the request message includes port related information of the DS-TT port and/or port related information of the NW-TT port. In an implementation manner, the type of the TT in the port related information of the DS-TT port is DS-TT. In an implementation manner, the type of the TT in the port related information of the NW-TT port is NW-TT.

The port related information from the SMF to the PCF includes at least one of the following: TT related information of the TT associated with the port, PDB information, and UE-DS-TT residence time (which may be the processing time between the port and the terminal).

In an implementation manner, the PDB information is a PDB per NW-TT port per traffic class (PDB per UE per traffic class).

In an implementation manner, the UE-DS-TT residence time may be UE-DS-TT residence time per DS-TT port per traffic class (UE-DS-TT residence time per port per traffic class).

Step 6: The PCF sends port related information to the AF, including at least one of the following: TT related information of the TT associated with the port, PDB information (PDB per UE per traffic class), and UE-DS-TT residence time (UE-DS-TT residence time per port per traffic class).

The AF can perform one of the following according to the related information of the TT of the port:
  constructing a first port pair, where the first port pair includes one DS-TT port and one NW-TT port;
  constructing a second port pair, where the second port pair includes one DS-TT port and another DS-TT port. The two DS-TT ports may be ports of the same DS-TT or different DS-TTs;
  calculating the delay of the first port pair (that is, the time taken for a packet to transmit from the ingress of the port pair to the egress); and
  calculating the delay of the second port pair.

In an implementation manner, the delay of the first port pair may be UE-DS-TT residence time+PDB.

In an implementation manner, the delay of the second port pair may be the first UE-DS-TT residence time+the first PDB+the second UE-DS-TT residence time+the second PDB.

Step 7: The AF sends an event notification response to the PCF.

Step 8: The PCF sends a modification response associated with a session management policy triggered by the SMF/an establishment response associated with a session management policy triggered by the SMF to the SMF.

Step 9: The SMF sends a PDU session-session management context update response/a PDU session-session management context establishment response to the AMF.

Step 10: The AMF sends a NAS message to the UE, where the NAS message includes the PDU session modification acceptance/PDU session establishment acceptance.

Embodiment 2

This embodiment includes the following steps:
Step 1: A NW-TT receives a downlink data stream and performs at least one of the following according to data routing information (such as a static filtering entry) and the packet header information:
 selecting a DS-TT port for data transmission;
 selecting a PDU session corresponding to a DS-TT port for data transmission; and
 performing a port operation (forwarding, blocking, or the like).

The data routing information includes at least one of the following: a target MAC address, a VLAN ID, and an egress port.

Embodiment 3

Figure 7:
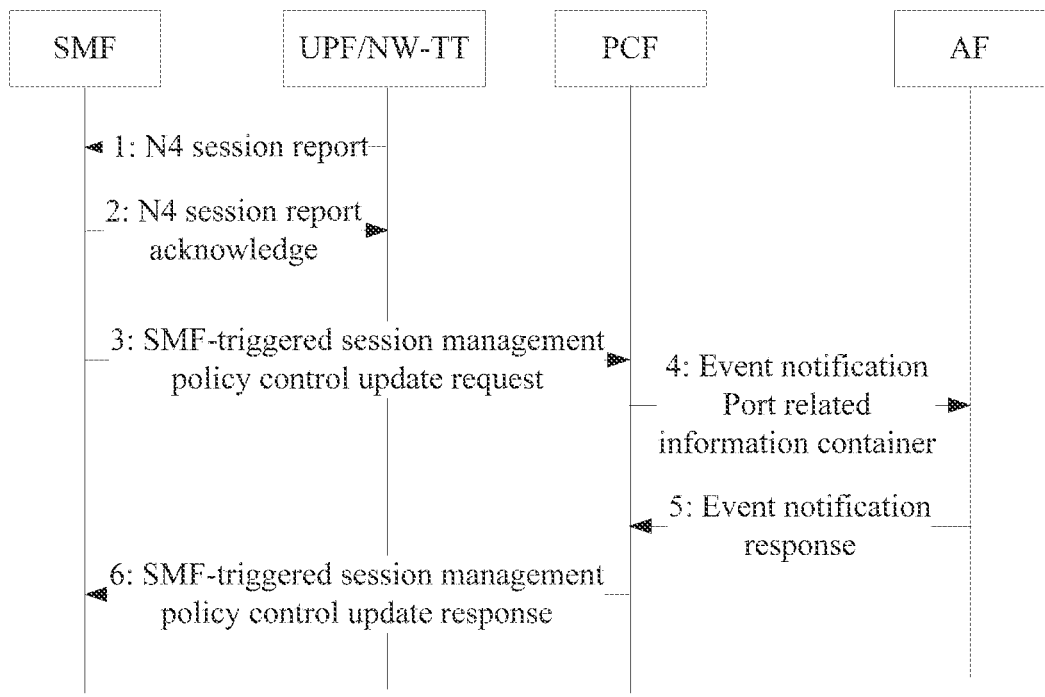
FIG. 7 is a schematic diagram of another application scenario according to an embodiment of the present disclosure.

This embodiment is shown in FIG. 7 and includes the following steps:
Step 1: The UPF obtains port related information of a NW-TT port (which may be information of one port or information of multiple ports).

When PDU sessions related to one or more DS-TT ports exist, the UPF sends the information of the NW-TT port to a first SMF. The first SMF is one of the following: an SMF of a PDU session related to any DS-TT, any PDU session in the bridge, an SMF associated with any PDU session established with the UPF, and a default SMF.

When no PDU session related to the DS-TT port exists, the UPF sends the port related information of the NW-TT port to the first SMF after a PDU session related to at least one DS-TT port is established. The first SMF is an SMF in the PDU session related to the at least one DS-TT port. The first SMF is described above and is no longer repeated herein.

The UPF sends the port related information of the NW-TT port to the first SMF. In some embodiments, the UPF may send the port related information of the NW-TT port through an N4 session report.

Step 2: The SMF sends an N4 session report acknowledge to the UPF.

Step 3: When the first SMF is an SMF related to a PDU session, the first SMF selects a policy-associated PCF associated with the PDU session to send the port-related information of the NW-TT port. When the first SMF is a default SMF, the first SMF selects a default PCF to send the port related information of the NW-TT port.

Step 4: The PCF sends the port related information of the NW-TT port to the AF.

The AF reports the port related information of the NW-TT port to the CNC.

Step 5: The AF sends an event notification response to the PCF.

Step 6: The PCF sends an SMF-triggered session management policy control update response to the SMF.

Embodiment 4

Figure 8:
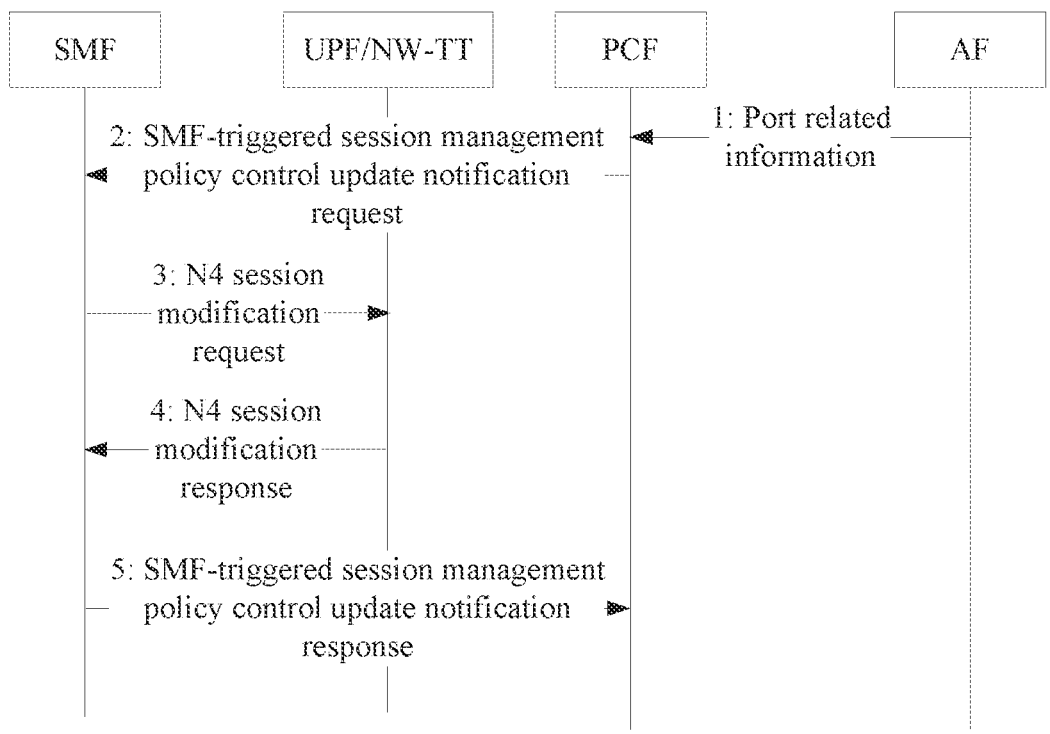
FIG. 8 is a schematic diagram of another application scenario according to an embodiment of the present disclosure.

This embodiment is shown in FIG. 8 and includes the following steps:
Step 1: The AF obtains port related information of a NW-TT port (which may be information of one port or information of multiple ports).

When PDU sessions related to one or more DS-TT ports exist, the UPF sends the information of the NW-TT port to a first PCF. The first PCF is one of the following: a PCF associated with a PDU session related to any DS-TT, a PCF associated with any PDU session in the bridge, a PCF associated with any PDU session established with the UPF, and a default PCF.

When no PDU session related to the DS-TT port exists, the UPF sends the port related information of the NW-TT port to the first PCF after a PDU session related to at least one DS-TT port is established. The first PCF is a PCF associated with the PDU session related to the at least one DS-TT port. The first PCF is described above and is no longer repeated herein.

Step 2: The UPF sends the port related information of the NW-TT port to the first PCF.

Step 3: When the first PCF is a PCF related to the PDU session, the SMF of the PDU session bound to the first PCF sends the port related information of the NW-TT port. When the first PCF is a default PCF, the first PCF selects a default SMF to send the port related information of the NW-TT port.

Step 4: The SMF sends the port related information of the NW-TT port to the UPF.

The UPF reports the port-related information of the NW-TT port to the NW-TT.

Step 5: The UPF returns a response to the SMF.

Figure 9:
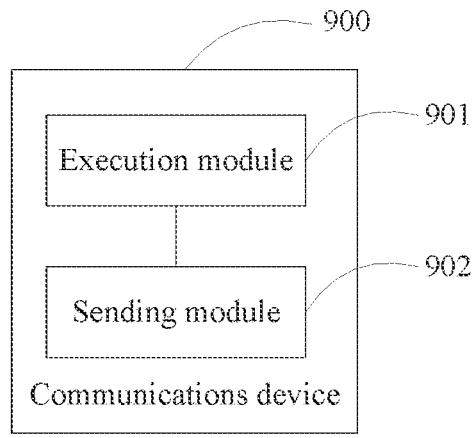
FIG. 9 is a structural diagram of a communications device according to the present disclosure.

Referring to FIG. 9, an embodiment of the present disclosure provides a communications device. The communications device is a first communications device. The first communications device includes, but is not limited to a terminal, a TT (such as one of the following: a DS-TT, a NW-TT, a first DS-TT, a second DS-TT, a first NW-TT, and a second NW-TT), a CN network element (such as one of the following: an SMF, a UPF, a PCF, a NEF, and an AF), and a RAN network element. As shown in FIG. 9, a communications device 900 includes:
 an execution module 901, configured to execute a related operation of a first port; and
 a sending module 902, configured to send first information; where
 the related operation of the first port includes at least one of the following: obtaining port related information of the first port, determining related information of a TT of the first port, and determining delay related information of the first port;
 the first information includes at least one of the following: the port related information of the first port, the related information of the TT of the first port, and the delay related information of the first port; and
 the first port is a port of a TT.

In some embodiments, the port related information of the first port includes at least one of the following:
   related information of a TT of the first port, and
   delay related information of the first port.

In some embodiments, the sending first information includes at least one of the following:
   sending the first information, where the first information is included inside a port management container;
   sending the first information, where the first information is included outside a port management container;
   sending the first information, where a part of the first information is included inside a port management container, and another part of the first information is included outside the port management container;
   sending the first information, where the first information is included inside a first container; and
   sending the first information, where the first information is included inside a second container; where
   the first container is used to transmit port related information of a DS-TT port and/or related information of a DS-TT; and
   the second container is used to transmit port related information of a NW-TT port and/or related information of a NW-TT.

In some embodiments, the related information of the TT includes at least one of the following: a type of the TT, identification information of the TT, and serial number information of the TT.

In some embodiments, the type of the TT is:
   DS-TT or NW-TT.

In some embodiments, the delay related information of the first port includes at least one of the following:
   a packet delay budget PDB and/or a traffic class corresponding to the PDB; and
   a processing time between a terminal and a DS-TT and/or a traffic class corresponding to the processing time.

In some embodiments, the PDB includes a PDB per traffic class of the first port.

The communications device 900 can implement processes implemented by the first communications device in the method embodiments of the present disclosure and achieve the same beneficial effect. To avoid repetition, details are not described herein again.

Figure 10:
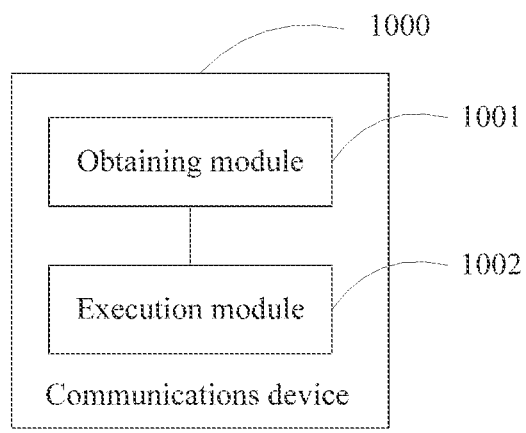
FIG. 10 is a structural diagram of another communications device according to the present disclosure.

Referring to FIG. 10, an embodiment of the present disclosure provides another communications device. The communications device is a second communications device. The second communications device includes, but is not limited to a terminal, a DS-TT, a NW-TT, a CN network element (such as one of the following: an SMF, a UPF, a PCF, a NEF, and an AF), and a
   an obtaining module 1001, configured to obtain second information; and
   an execution module 1002, configured to perform a port related operation according to the second information; where
   the second information includes at least one of the following: port related information of a first port, related information of a TT of the first port, delay related information of the first port, a first container, a second container, and a data channel MAC address; and
   the first port is a port of a TT.

In some embodiments, the port related information of the first port includes at least one of the following:
   related information of the TT of the first port; and
   delay related information of the first port.

In some embodiments, the related information of the TT includes at least one of the following: a type of the TT, identification information of the TT, and serial number information of the TT.

In some embodiments, the type of the TT is:
   DS-TT or NW-TT.

In some embodiments, the obtaining second information includes: obtaining first information; where
   the first information includes at least one of the following: the port related information of the first port, the related information of the TT of the first port, and the delay related information of the first port; and
   the obtaining first information may include one of the following:
   obtaining the first information, where the first information is included inside a port management container;
   obtaining the first information, where the first information is included outside a port management container;
   obtaining the first information, where a part of the first information is included inside a port management container, and another part of the first information is included outside the port management container;
   obtaining the first information, where the first information is included inside a first container; and
   obtaining the first information, where the first information is included inside a second container; where
   the first container is used to transmit port related information of a DS-TT port and/or related information of a DS-TT; and
   the second container is used to transmit port related information of a NW-TT port and/or related information of a NW-TT.

In some embodiments, the delay related information of the first port includes at least one of the following:
   a packet delay budget PDB and/or a traffic class corresponding to the PDB; and a processing time between a terminal and a DS-TT and/or a traffic class corresponding to the processing time.

In some embodiments, the PDB includes a PDB per traffic class of the first port.

In some embodiments, the port related operation includes at least one of the following:
   determining a type of the TT of the first port;
   determining delay related information of the port pair.

In some embodiments, the constructing a port pair includes at least one of the following:
   constructing a port pair including the first port;
   constructing a first-type port pair;
   constructing a second-type port pair; and
   constructing a third-type port pair; where
   the port pair including the first port includes at least one of the following:
   a NW-TT port and a DS-TT port, where the first port is a port of the NW-TT port or the DS-TT port; or
   two NW-TT ports, where the first port is a port of the two NW-TT ports; or
   two DS-TT ports, where the first port is a port of the two DS-TT ports;
   the first-type port pair is a port pair formed by a NW-TT port and a DS-TT port;
   the second-type port pair is a port pair formed by a first DS-TT port and a second DS-TT port; and
   the third-type port pair is a port pair formed by a first NW-TT port and a second NW-TT port.

In some embodiments, the determining the delay related information of the port pair includes at least one of the following:

determining delay related information of the port pair including the first port;
determining delay related information of the first-type port pair;
determining a delay of the second-type port pair; and
determining a delay of the third-type port pair; where
the first-type port pair is a port pair formed by a NW-TT port and a DS-TT port;
the second-type port pair is a port pair formed by a first DS-TT port and a second DS-TT port; and
the third-type port pair is a port pair formed by a first NW-TT port and a second NW-TT port.

In some embodiments, the first DS-TT and the second DS-TT are the same DS-TT; or
the first DS-TT and the second DS-TT are different DS-TTs, and the first DS-TT and the second DS-TT access a network through a same terminal; or
the first DS-TT and the second DS-TT are different DS-TTs, and the first DS-TT and the second DS-TT access a network through different terminals.

The communications device 1000 can implement processes implemented by the second communications device in the method embodiments of the present disclosure and achieve the same beneficial effect. To avoid repetition, details are not described herein again.

Figure 11:
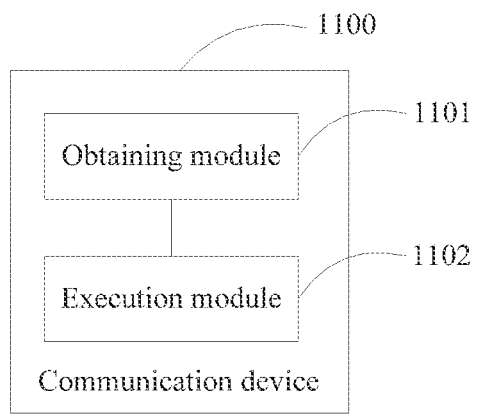
FIG. 11 is a structural diagram of another communications device according to the present disclosure.

Referring to FIG. 11, an embodiment of the present disclosure provides another communications device. The communications device is a third communications device. The third communications device includes, but is not limited to a terminal, a DS-TT, a NW-TT, a CN network element (such as one of the following: an SMF, a UPF, a PCF, a NEF, and an AF), and a RAN network element. As shown in FIG. 11, the communications device 1100 includes:

an obtaining module 1101, configured to obtain data routing information, where the data routing information includes at least one of the following: data stream identification information and port related information; and
an execution module 1102, configured to perform a related operation on a downlink data stream according to the data routing information.

In some embodiments, the performing a related operation on the downlink data stream includes at least one of the following:
selecting a DS-TT port to send the downlink data stream;
selecting a data channel to send the downlink data stream, where the data channel is a data channel corresponding to a DS-TT port; and
performing a port operation on the downlink data stream.
In some embodiments, the port operation includes:
forwarding or blocking.

The communications device 1100 can implement processes implemented by the third communications device in the method embodiments of the present disclosure and achieve the same beneficial effect. To avoid repetition, details are not described herein again.

Figure 12:
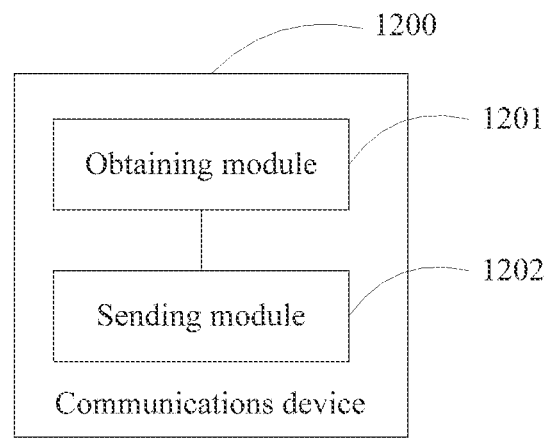
FIG. 12 is a structural diagram of another communications device according to the present disclosure.

Referring to FIG. 12, an embodiment of the present disclosure provides another communications device. The communications device is a fourth communications device. The fourth communications device includes, but is not limited to a terminal, a DS-TT, a NW-TT, a CN network element (such as one of the following: an SMF, a UPF, a PCF, a NEF, and an AF), and a RAN network element. As shown in FIG. 12, the communications device 1200 includes:

an obtaining module 1201, configured to obtain port related information of a second port; and
a sending module 1202, configured to send the port related information of the second
the second port is a port of a NW-TT.

In some embodiments, in a case that a first condition is met, the sending the port related information of the second port includes:
selecting any data channel and sending the port related information of the second port to a communications device related to the selected data channel; where
the first condition includes one of the following:
at least one data channel exists within the bridge; and
at least one data channel established with the fourth communications device exists.

In some embodiments, in a case that a second condition is met, the sending the port related information of the second port includes:
sending the port related information of the second port after at least one data channel is established; or
sending the port related information of the second port to any communications device or a default communications device within a bridge; where
the second condition includes one of the following:
no data channel exists within the bridge; and
no data channel established with the fourth communications device exists.

In some embodiments, the data channel includes:
a data channel related to a DS-TT port.

In some embodiments, the selected communications device includes:
a communications device related to any data channel; or
any communications device within the bridge; or
a communications device related to any data channel established with the fourth communications device; or
a default communications device.

The communications device 1200 can implement processes implemented by the fourth communications device in the method embodiments of the present disclosure and achieve the same beneficial effect. To avoid repetition, details are not described herein again.

Figure 13:
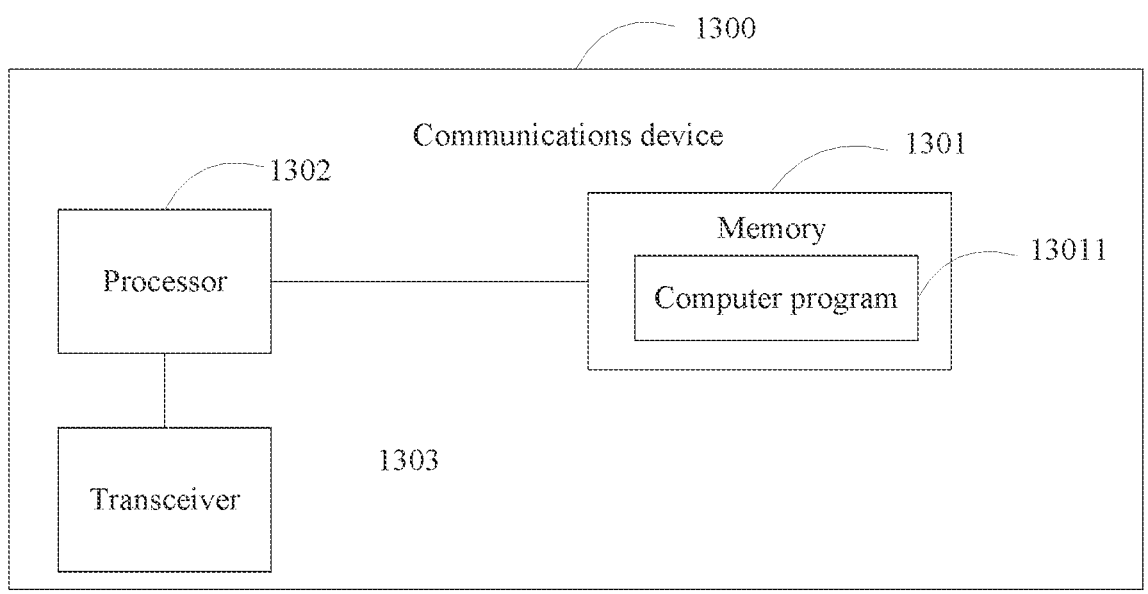
FIG. 13 is a structural diagram of another communications device according to the present disclosure.

Referring to FIG. 13, FIG. 13 is a structural diagram of another communications device according to an embodiment of the present disclosure. As shown in FIG. 13, a communications device 1300 includes: a memory 1301, a processor 1302, a computer program 13011 stored in the memory 1301 and executable on the processor 1302, and a transceiver 1303.

When the communications device 1300 is the first communications device in the foregoing method embodiment, the following steps are implemented when the computer program 13011 is executed by the processor 1302:
performing a related operation of a first port; and
sending first information through the transceiver 1303; where
the related operation of the first port includes at least one of the following: obtaining port related information of the first port, determining related information of a TT of the first port, and determining delay related information of the first port;
the first information includes at least one of the following: the port related information of the first port, the related information of the TT of the first port, and the delay related information of the first port; and
the first port is a port of a TT.

In some embodiments, the port related information of the first port includes at least one of the following:
related information of the TT of the first port; and
delay related information of the first port.

In some embodiments, the sending first information includes at least one of the following:
sending the first information, where the first information is included inside a port management container;
sending the first information, where the first information is included outside a port management container;
sending the first information, where a part of the first information is included inside a port management container, and another part of the first information is included outside the port management container;
sending the first information, where the first information is included inside a first container; and
sending the first information, where the first information is included inside a second container; where
the first container is used to transmit port related information of a DS-TT port and/or related information of a DS-TT; and
the second container is used to transmit port related information of a NW-TT port and/or related information of a NW-TT.

In some embodiments, the related information of the TT includes at least one of the following: a type of the TT, identification information of the TT, and serial number information of the TT.

In some embodiments, the type of the TT is:
DS-TT or NW-TT.

In some embodiments, the delay related information of the first port includes at least one of the following:
a packet delay budget PDB and/or a traffic class corresponding to the PDB; and
a processing time between a terminal and a DS-TT and/or a traffic class corresponding to the processing time.

In some embodiments, the PDB includes a PDB per traffic class of the first port.

When the communications device 1300 is the second communications device in the foregoing method embodiment, the following steps are implemented when the computer program 13011 is executed by the processor 1302:
obtaining second information; and
performing a port related operation according to the second information; where
the second information includes at least one of the following: port related information of a first port, related information of a TT of the first port, delay related information of the first port, a first container, a second container, and a data channel MAC address; and
the first port is a port of a TT.

In some embodiments, the port related information of the first port includes at least one of the following:
related information of the TT of the first port; and
delay related information of the first port.

In some embodiments, the related information of the TT includes at least one of the following: a type of the TT, identification information of the TT, and serial number information of the TT.

In some embodiments, the type of the TT is:
DS-TT or NW-TT.

In some embodiments, the obtaining second information includes: obtaining first information; where
the first information includes at least one of the following:
the port related information of the first port, the related information of the TT of the first port, and the delay related information of the first port; and
the obtaining first information may include one of the following:
obtaining the first information, where the first information is included inside a port management container;
obtaining the first information, where the first information is included outside a port management container;
obtaining the first information, where a part of the first information is included inside a port management container, and another part of the first information is included outside the port management container;
obtaining the first information, where the first information is included inside a first container; and
obtaining the first information, where the first information is included inside a second container; where
the first container is used to transmit port related information of a DS-TT port and/or related information of a DS-TT; and
the second container is used to transmit port related information of a NW-TT port and/or related information of a NW-TT.

In some embodiments, the delay related information of the first port includes at least one of the following:
a PDB and/or a traffic class corresponding to the PDB; and
a processing time between a terminal and a DS-TT and/or a traffic class corresponding to the processing time.

In some embodiments, the PDB includes a PDB per traffic class of the first port.

In some embodiments, the port related operation includes at least one of the following:
determining a type of the TT of the first port;
constructing a port pair; and
determining delay related information of the port pair.

In some embodiments, the constructing a port pair includes at least one of the following:
constructing a port pair including the first port;
constructing a first-type port pair;
constructing a second-type port pair; and
constructing a third-type port pair; where
the port pair including the first port includes at least one of the following:
a NW-TT port and a DS-TT port, where the first port is a port of the NW-TT port or the DS-TT port; or
two NW-TT ports, where the first port is a port of the two NW-TT ports; or
two DS-TT ports, where the first port is a port of the two DS-TT ports;
the first-type port pair is a port pair formed by a NW-TT port and a DS-TT port;
the second-type port pair is a port pair formed by a first DS-TT port and a second DS-TT port; and
the third-type port pair is a port pair formed by a first NW-TT port and a second NW-TT port.

In some embodiments, the determining the delay related information of the port pair includes at least one of the following:
determining the delay related information of the port pair including the first port;
determining the delay related information of the first-type port pair;
determining a delay of the second-type port pair; and
determining a delay of the third-type port pair; where
the first-type port pair is a port pair formed by a NW-TT port and a DS-TT port;
the second-type port pair is a port pair formed by a first DS-TT port and a second DS-TT port; and
the third-type port pair is a port pair formed by a first NW-TT port and a second NW-TT port.

In some embodiments, the first DS-TT and the second DS-TT are the same DS-TT; or the first DS-TT and the second DS-TT are different DS-TTs, and the first DS-TT and the second DS-TT access a network through a same terminal; or the first DS-TT and the second DS-TT are different DS-TTs, and the first DS-TT and the second DS-TT access a network through different terminals.

When the communications device 1300 is the third communications device in the foregoing method embodiments, the following steps are implemented when the computer program 13011 is executed by the processor 1302:

obtaining data routing information, where the data routing information includes at least one of the following: data stream identification information and port related information; and performing a related operation on a downlink data stream according to the data routing information.

In some embodiments, the performing a related operation on the downlink data stream includes at least one of the following:

selecting a DS-TT port to send the downlink data stream;

selecting a data channel to send the downlink data stream, where the data channel is a data channel corresponding to a DS-TT port; and performing a port operation on the downlink data stream.

In some embodiments, the port operation includes:

forwarding or blocking.

When the communications device 1300 is the fourth communications device in the foregoing method embodiments, the following steps are implemented when the computer program 13011 is executed by the processor 1302:

obtaining port related information of a second port; and sending the port related information of the second port through the transceiver 1303; where the second port is a port of a NW-TT.

In some embodiments, in a case that the first condition is met, the sending the port related information of the second port includes:

selecting any data channel and sending the port related information of the second port to a communications device related to the selected data channel; wherein the first condition includes one of the following:

at least one data channel exists within the bridge; and at least one data channel established with the fourth communications device exists.

In some embodiments, in a case that the second condition is met, the sending the port related information of the second port includes:

sending the port related information of the second port after at least one data channel is established; or sending the port related information of the second port to any communications device or a default communications device within a bridge; wherein the second condition includes one of the following:

no data channel exists within the bridge; and no data channel established with the fourth communications device exists.

In some embodiments, the data channel includes:

a data channel related to DS-TT port.

In some embodiments, the selected communications device includes:

a communications device related to any data channel; or any communications device within the bridge; or a communications device related to any data channel established with the fourth communications device; or a default communications device.

The communications device 1300 can implement processes implemented by the communications device in the foregoing method embodiments. To avoid repetition, details are not described herein again.

An embodiment of the present disclosure further provides a computer-readable storage medium. The computer-readable storage medium stores a computer program, and when the computer program is executed by a processor, the processes of the foregoing method embodiment of the information transmission method are implemented and a same technical effect can be achieved. To avoid repetition, details are not described herein again. The computer-readable storage medium is, for example, a Read-Only Memory (ROM), a Random Access Memory (RAM), a magnetic disk, or an optical disc.

It should be noted that in this specification, the term "include", "including", or any other variant is intended to cover non-exclusive inclusion, so that a process, method, article, or apparatus that includes a series of elements includes not only those elements but also other elements that are not explicitly listed, or includes elements inherent to such a process, method, article, or apparatus. An element limited by "includes a . . . ", without more constraints, does not preclude the presence of additional identical elements in the process, method, article, or apparatus that includes the element.

According to the foregoing descriptions of the implementations, a person skilled in the art may clearly understand that the foregoing method embodiments may be implemented by using software and a required universal hardware platform, or certainly may be implemented by using hardware. However, in many cases, the former is a better implementation. Based on such understanding, the technical solutions of the present disclosure essentially or the part contributing to the prior art may be implemented in a form of a software product. The computer software product is stored in a storage medium (such as a ROM/RAM, a hard disk, or an optical disc), and includes several instructions for instructing a terminal (which may be mobile phone, a computer, a server, an air conditioner, a network device, or the like) to perform the methods described in the embodiments of the present disclosure.

The embodiments of the present disclosure are described above with reference to the accompanying drawings, but the present disclosure is not limited to the foregoing specific implementations. The foregoing specific implementations are merely exemplary instead of restrictive. Under enlightenment of the present disclosure, a person of ordinary skill in the art may make many forms without departing from the aims of the present disclosure and the protection scope of claims, all of which fall within the protection scope of the present disclosure.

The foregoing descriptions are merely the preferred implementations of the present disclosure. It should be noted that those of ordinary skill in the art may further make several improvements and refinements without departing from the principles described in the present disclosure, and these improvements and refinements also fall within the protection scope of the present disclosure.

The invention claimed is:

1. An information transmission method, performed by a User Plane Function (UPF), comprising:

obtaining port related information of a second port, wherein the port related information of the second port comprises at least one of the following: a port number, a bridge identifier, a port address, related information of a Time-sensitive network Translator (TT) of the second port, delay related information of the second port, or a port management information container including second port information; and in response to determining that a first condition is satisfied, selecting any one data channel from a plurality of data channels established with the UPF and sending the port related information of the second port to a Session Management Function (SMF) related to the selected data channel for the SMF to forward the received port related information of the second port to a Policy Control Function (PCF) or an Application Function (AF), wherein each data channel of the plurality of data channels is related to a Device-Side Time-sensitive network Translator (DS-TT) port, wherein the second port is a port of a NetWork-side Time-sensitive network Translator (NW-TT), the first condition comprises one of the following:

the plurality of data channels exist within a bridge; or the plurality of data channels established with the UPF exist.

2. The method according to claim 1, wherein based on determining that a second condition is satisfied, the sending the port related information of the second port comprises:

sending the port related information of the second port after at least one data channel is established; or sending the port related information of the second port to any communications device or a default communications device within a bridge; wherein the second condition comprises one of the following:

no data channel exists within the bridge; and no data channel established with the UPF exists.

3. The method according to claim 1, wherein the selected data channel comprises a Protocol Data Unit (PDU) session or an N4 session.

4. The method according to claim 1, wherein the plurality of data channels comprise: a Protocol Data Unit (PDU) session or an N4 session.

5. A User Plane Function (UPF), comprising:

a memory storing computer-readable instructions; and a processor coupled to the memory, wherein the instructions, when executed by the processor, cause the processor to perform operations comprising:

obtaining port related information of a second port, wherein the port related information of the second port comprises at least one of the following: a port number, a bridge identifier, a port address, related information of a Time-sensitive network Translator (TT) of the second port, delay related information of the second port, or a port management information container including second port information; and in response to determining that a first condition is satisfied, selecting any one data channel from a plurality of data channels established with the UPF and sending the port related information of the second port to a Session Management Function (SMF) related to the selected data channel for the SMF to forward the received port related information of the second port to a Policy Control Function (PCF) or an Application Function (AF), wherein each data channel of the plurality of data channels is related to a Device-Side Time-sensitive network Translator (DS-TT) port, wherein the second port is a port of a NetWork-side Time-sensitive network Translator (NW-TT), the first condition comprises one of the following:

the plurality of data channels exist within a bridge; or the plurality of data channels established with the UPF exist.

6. The UPF according to claim 5, wherein based on determining that a second condition is satisfied, the sending the port related information of the second port comprises:

sending the port related information of the second port after at least one data channel is established; or sending the port related information of the second port to any communications device or a default communications device within a bridge; wherein the second condition comprises one of the following:

no data channel exists within the bridge; and no data channel established with the UPF exists.

7. The UPF according to claim 5, wherein the selected data channel comprises a Protocol Data Unit (PDU) session or an N4 session.

8. The UPF according to claim 5, wherein the plurality of data channels comprise: a Protocol Data Unit (PDU) session or an N4 session.

9. A non-transitory computer-readable medium storing instructions that, when executed by a User Plane Function (UPF) cause the UPF to perform operations comprising:

obtaining port related information of a second port, wherein the port related information of the second port comprises at least one of the following: a port number, a bridge identifier, a port address, related information of a Time-sensitive network Translator (TT) of the second port, delay related information of the second port, or a port management information container including second port information; and in response to determining that a first condition is satisfied, selecting any one data channel from a plurality of data channels established with the UPF and sending the port related information of the second port to a Session Management Function (SMF) related to the selected data channel for the SMF to forward the received port related information of the second port to a Policy Control Function (PCF) or an Application Function (AF), wherein each data channel of the plurality of data channels is related to a Device-Side Time-sensitive network Translator (DS-TT) port, wherein the second port is a port of a NetWork-side Time-sensitive network Translator (NW-TT), the first condition comprises one of the following:

the plurality of data channels exist within a bridge; or the plurality of data channels established with the UPF exist.

10. The non-transitory computer-readable medium according to claim 9, wherein based on determining that a second condition is satisfied, the sending the port related information of the second port comprises:

sending the port related information of the second port after at least one data channel is established; or sending the port related information of the second port to any communications device or a default communications device within a bridge; wherein the second condition comprises one of the following:

no data channel exists within the bridge; and no data channel established with the communications device exists.

11. The non-transitory computer-readable medium according to claim 9, wherein the selected data channel comprises a Protocol Data Unit (PDU) session or an N4 session.

12. The non-transitory computer-readable medium according to claim 9, wherein the plurality of data channels comprise: a Protocol Data Unit (PDU) session or an N4 session.

* * * * *